(12) United States Patent
Koch et al.

(10) Patent No.: US 8,628,310 B2
(45) Date of Patent: Jan. 14, 2014

(54) FAN SYSTEM HAVING IMPROVED AVAILABILITY AND METHOD FOR ITS OPERATION

(75) Inventors: Stefan Koch, Kappelrodeck (DE); Patric Kahles, Buehl (DE); Volker Lurk, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 748 days.

(21) Appl. No.: 12/449,004

(22) PCT Filed: Dec. 10, 2007

(86) PCT No.: PCT/EP2007/063564
§ 371 (c)(1),
(2), (4) Date: Feb. 25, 2010

(87) PCT Pub. No.: WO2008/095565
PCT Pub. Date: Aug. 14, 2008

(65) Prior Publication Data
US 2010/0150736 A1    Jun. 17, 2010

(30) Foreign Application Priority Data
Feb. 5, 2007 (DE) .......................... 10 2007 005 571

(51) Int. Cl.
*F04B 23/04*    (2006.01)
*F04B 41/06*    (2006.01)

(52) U.S. Cl.
USPC ..... 417/426; 417/44.11; 318/471; 123/41.49; 388/934

(58) Field of Classification Search
USPC .................. 417/16, 32, 411, 44.11, 3, 5, 426; 318/434, 455, 461, 471; 123/41.49; 62/183, 179, 507; 236/35; 388/934
See application file for complete search history.

(56) References Cited

U.S. PATENT DOCUMENTS

| | | | |
|---|---|---|---|
| 5,137,428 A | | 8/1992 | Poll et al. |
| 6,747,432 B2 * | | 6/2004 | Yoshimura .................... 318/599 |
| 6,924,568 B2 * | | 8/2005 | Dhuey ......................... 307/130 |
| 6,986,260 B2 * | | 1/2006 | Oda et al. ....................... 62/179 |
| 7,122,984 B2 * | | 10/2006 | Koch et al. ............... 318/400.31 |
| 2005/0268128 A1 * | | 12/2005 | Wu et al. ........................ 713/322 |
| 2006/0181232 A1 * | | 8/2006 | Oljaca et al. ................... 318/268 |

FOREIGN PATENT DOCUMENTS

| | | |
|---|---|---|
| EP | 0 722 214 | 7/1996 |
| EP | 1 383 232 | 1/2004 |
| EP | 1383232 A2 * | 1/2004 |
| EP | 1 589 652 | 10/2005 |
| WO | WO 2006/006288 | 1/2006 |

OTHER PUBLICATIONS

Machine translation of EP1383232 published Jan. 2004.*

* cited by examiner

*Primary Examiner* — Devon Kramer
*Assistant Examiner* — Thomas Fink
(74) *Attorney, Agent, or Firm* — Kenyon & Kenyon LLP

(57) ABSTRACT

A fan system includes: two circuit breakers, a control module for controlling two circuit breakers, two electric motors to which their operating voltage $U_B$ is supplied via the circuit breakers, and at least one temperature sensor on a board on which the circuit breakers are located. The control module evaluates a signal $T_{NTC}$ from the temperature sensor, and sets the pulse duty factors $TV_1$, $TV_2$ of pulsed control voltages at the circuit breakers, while taking into account this signal as well as a requested fan power, in such a way that no power loss $P_V$ exceeding a specified value occurs at any circuit breaker.

10 Claims, 1 Drawing Sheet

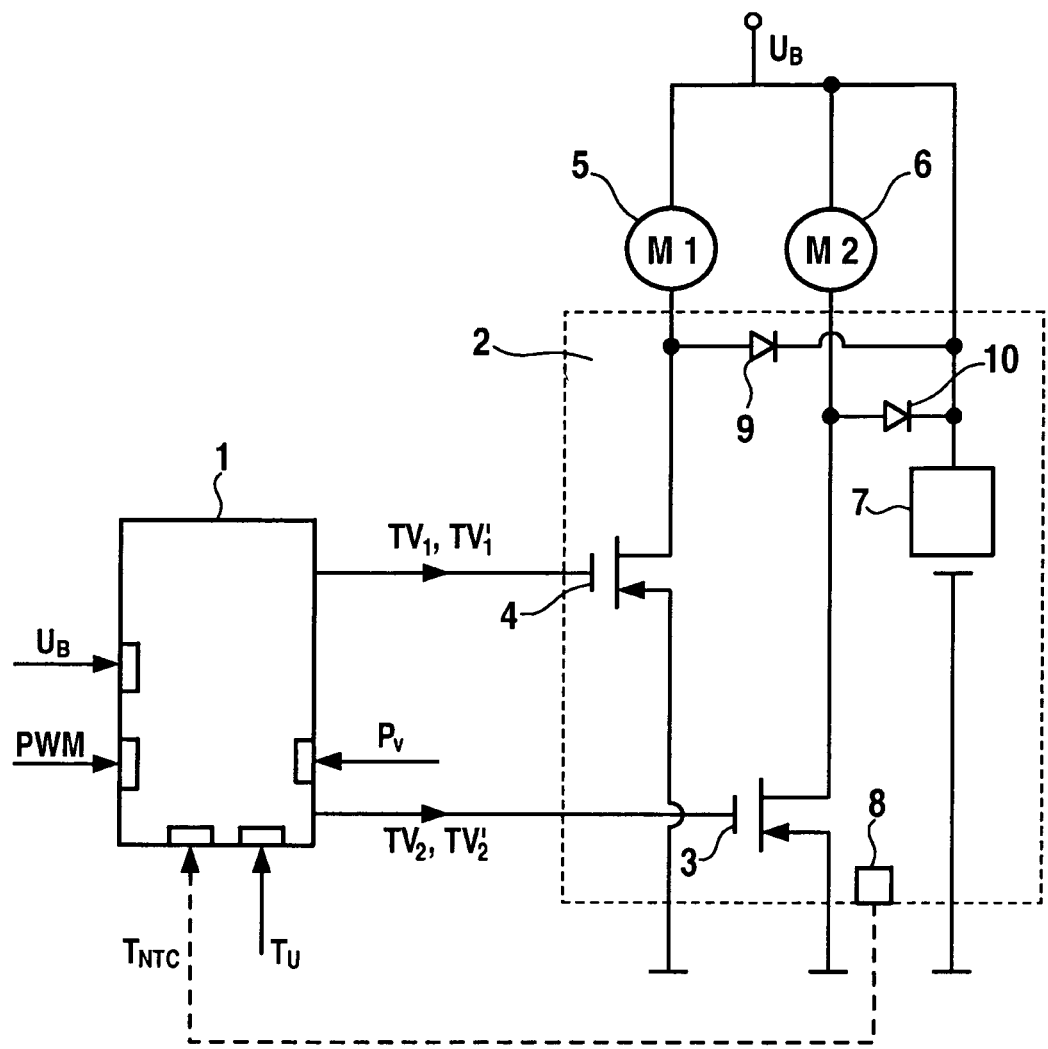

FAN SYSTEM HAVING IMPROVED AVAILABILITY AND METHOD FOR ITS OPERATION

BACKGROUND OF THE INVENTION

1. Field of the Invention

The present invention relates to a fan system having improved availability, e.g., of the type used for supporting cooling of internal combustion engines, as well as a method for its operation.

2. Description of Related Art

It is generally customary to use electrical drives for cooling blowers on internal combustion engines. These electrical drives are operated via motor control modules (FCM or fan control module). A changeable pulse width modulated voltage (PWM) having a variable pulse duty factor ($T_V$) is used to change the actual voltage present at an electrical drive developed as a DC motor, so that the rotational speed of the electrical drive is able to be influenced in this manner.

It is known that one may construct the motor control modules based on power semiconductors. These power semiconductors, and additional components required for their operation, have a power loss that is a function of the clock pulse of the voltage present or the pulse duty factor and the height of the voltage present. It is customary, for this reason, to monitor the temperature of the board on which the components mentioned are located, and to take measures to avoid critical heating of the board and the components located on it. For this purpose, temperature sensors are commonly used. It is known that as temperature sensors, one may use components that have a negative temperature coefficient, so-called NTC elements (negative temperature coefficient).

Among the measures used for avoiding critical temperatures in the area of the board of a motor control module, one that is well known is the monitoring of the board temperature and switching off the drive of the cooling blower when a critical temperature is exceeded. This creates thermal coupling between the temperature sensor and the power components on the board, which has the result that, upon the attainment of the critical temperature, for example, the drive of the blower is no longer available for any further supporting cooling of the coolant circuit of an internal combustion engine.

In connection with the blower system, it is also known that one may control the power semiconductors and the additional electronic components required for their operation, that are used in motor control modules, in such a way that operating points are avoided which have been proven to be connected with a maximum power loss at the respective component. Various semiconductor components based on transistors, used as switches, for example, show a strong dependence of the power loss on a present pulse duty factor of the control voltage, which has the result that, at typical switching frequencies required for the operation of fan motors, the power loss at such semiconductor components becomes a maximum when the pulse duty factor is approximately 99% of the maximum pulse duty factor that may be called for, that is, barely below continuous operation. Capacitors connected in parallel to power semiconductor elements frequently demonstrate a fundamentally different dependence of the power loss on the pulse duty factor with which the respective power semiconductors element is controlled. These capacitors frequently demonstrate a maximum power loss at a pulse duty factor of approximately 80% of the maximum pulse duty factor that may be called for. The behavior of these components is taken into account in the control of the circuit breakers in combination with the monitoring of the board temperature. When a board temperature is reached that is classified as being critical, the pulse duty factor is set to a constant value that ensures that critical pulse duty factors at increased power loss at the respective components is avoided until the board temperature has possibly reached non-critical values again. Only if this measure does not achieve success, there takes place, as in usual motor control modules, the complete switching off of the blower until the board has again reached temperature ranges in which the power electronics system is ready for operation. The setting of a constant pulse duty factor leads to the availability of the blower not being totally lost, but in a certain temperature window, no further regulated request for fan performance is able to take place. When there is an additional increase in the temperature, a complete shut-down of the availability of the blower also takes place (see, e.g., published European patent document EP 1383232A2).

BRIEF SUMMARY OF THE INVENTION

An object of the present invention is to increase the availability of blower cooling at critical temperature conditions, compared to the related art.

The essence of the invention is to produce the performance, that is usually able to be demanded of a blower or fan, by a fan system having two PWM-controlled motors and two fans, which are optionally able to be operated singly or in parallel, and which are controlled according to a regimen which prevents one of the motors from being operated in such a way that a pulse duty factor is present at one of the components used, that are required for controlling the motor, which leads to a power loss that is close to the maximum possible power loss at this component. The associated board is designed so that lower power losses at normal operating conditions do not lead to critical heating of the electronic system. In the stipulation of the control regimen, temperature measurement values may be included, as well as prognoses of the temperature curve to be expected, based on the knowledge of the thermal response of the control of the motors, particularly in the area of the board having the power semiconductor elements, so that the fan control selects a state in which the power loss of the electronics goes down overall, or rather the overloading of individual elements in response to the continuation of the availability of the fan system, as well as controllability of the power of the fan system given off is avoided. One fan system according to the present invention, in a minimum configuration, includes a control module for controlling two circuit breakers, two circuit breakers, two electric motors which have their operating voltage supplied via the circuit breakers, and at least one temperature sensor on a board on which the circuit breakers are located, the control module having means for evaluating a signal of the temperature sensor, and, taking this signal into account, as well as a requested fan performance, setting the pulse duty factors of pulsed control voltages at the circuit breakers in such a way that no power loss sets in at any power component that exceeds a specified value. By power components, in this instance, one should understand all the components included at least at times directly in the operating voltage circuit of the electric motors which, besides transistor-based switching elements may also include capacitors and/or free-wheeling inductors.

Even in the case of critical board temperatures, which could possibly set in because of unfavorable external conditions, there exists complete availability of the fan system according to the present invention, as well as the possibility of also operating the latter in a regulated manner.

BRIEF DESCRIPTION OF THE DRAWING

FIG. 1 shows a block diagram of a fan system according to the present invention.

DETAILED DESCRIPTION OF THE INVENTION

The present invention is explained in greater detail, using one exemplary embodiment. The single FIGURE shows a simplified block diagram of a fan system according to the present invention, in a motor vehicle. It includes a control module 1, which is able to evaluate various input signals, and generate from that output signals in the form of two control voltages having a separately adjustable pulse duty factor $TV_1$, $TV_2$. On a board 2, two circuit breakers 3, 4 are located, which are made up essentially of power semiconductor components based on transistors. The control voltages emitted by control module 1 are present at these circuit breakers, and, corresponding to their respective pulse duty factor $TV_1$, $TV_2$, they disconnect via these circuit breakers 3, 4 two current paths via which an operating voltage is supplied to two electric motors. Circuit breakers 3, 4 additionally include at least one power capacitor 7, in the form of an electrolyte capacitor in parallel connection, which contributes to stabilizing the vehicle electrical system voltage during the switching processes. Compared to second motor 6, first motor 5 has a nominal power that is higher by about 20%.

Input signals, which are able to be evaluated by control module 1, are supplied to it via appropriate connecting means. A first input signal PWM supplies data on fan performance requested via an engine control of the motor vehicle, and is present at the input of the control module. A second input signal $T_{NTC}$ supplies data on the board temperature, as the output signal of a temperature sensors 8 that is situated on board 2, in the form of an NTC element. Additional input signals are present at additional inputs of control module 1, and, in the present exemplary embodiment, they supply data on the respective vehicle electrical system voltage of the motor vehicle, which, at the same time, corresponds to the switched operating voltage $U_B$ of motors 5, 6, on the surrounding temperature $T_U$ in the engine compartment or outside the motor vehicle, as well as on the power loss $P_V$ occurring in the circuit. All these data, without claim of being complete, may be included in the calculation of the pulse duty factors of the output signals, and may help to avoid operating states which could impair the availability of the fan system. Free-wheeling circuit diodes 9, 10 are integrated into the current paths to connect motors 5, 6 to power capacitor 7.

In order to explain the method according to the present invention, we shall first of all only go into the processing of input signals PWM and $T_{NTC}$. Upon a request for a low fan power by the engine control of the motor vehicle, and a non-critical board temperature, the incoming PWM signal is converted to a pulsed control voltage having a pulse duty factor $TV_1$, which has the result that the first motor 5 operates at a speed that makes it possible for it alone to produce the demanded fan power. Second motor 6 remains switched off in this operating state, which is equivalent to $TV_2=0$. If a higher fan power is requested, control module 1 increases pulse duty factor $TV_1$, and the power given off by first motor 5 increases because of the increase in its speed. At a pulse duty factor $TV_1=80\%$, an operating state would be attained in which, at power capacitor 7, its maximum power loss would occur. By evaluating temperature signal $T_{NTC}$ of temperature sensor 8, control module 1 checks whether this operating state is able to be maintained, or whether critical heating of board 2 to a boundary temperature $T_1$ will occur. If the board temperature shows non-critical values, control module 1 may further increase pulse duty factor $TV_1$, in order further to increase the power output of first motor 5 by increasing its speed. If it is shown by input signal $T_{TNC}$ that the board temperature has reached boundary temperature $T_1$, the power of first motor 5 is reduced by lowering $TV_1$, and second motor 6 is additionally activated, whereby both motors 5, 6 operate at relatively low power, and $TV_1$ and $TV_2$ are adjusted in such a way that all power components 3, 4, 7 are operated at operating points at which a power loss occurs that is clearly below the maximum power loss possible at these power components 3, 4, 7. Control module 1 controls the two pulse duty factors $TV_1$ and $TV_2$ in such a way that the power given off by motors 5, 6 in total corresponds to the requested fan power.

If the requested fan power increases further, a state may be reached at any time at which, at uniform control of motors 5, 6 and a requested fan power of 80%, a pulse duty factor $TV_1$, $TV_2$ for controlling circuit breakers 3, 4 of also 80% would come about. As has already been pointed out, at such a pulse duty factor, capacitor 7 has its maximum power loss. Consequently, in the area of capacitor 7 and the entire board 2, an increase in temperature may come about which is transmitted via temperature sensor 8 to control module 1. When a second boundary temperature $T_2$ is reached, according to the present invention, there takes place a raising of pulse duty factor $TV_1$ for controlling circuit breaker 3 to a modified constant pulse duty factor $TV_{1'}$, while at the same time pulse duty factor $TV_2$ for controlling circuit breaker 4 is reduced in a manner such that the total power of the fan system still corresponds to the demanded fan power. Power requests input into control module 1, in this state are included in the control of second motor 6 via pulse duty factor $TV_2$, while first motor 5 is operated at pulse duty factor $TV_{1', 100}\%$ as a rule, that is, the maximum possible pulse duty factor that causes continuous operation of motor 5 at maximum speed. In one particularly simple alternative, after limiting temperature $T_2$ is exceeded, the two motors 5, 6 are operated in an uncontrolled fashion, for example, by putting one motor 5 at a maximum pulse duty factor $TV_{1'max}$, while second motor 6 is operated having a clearly reduced constant pulse duty factor $TV_{2'}$, and thus a clearly reduced power loss at power components 4 and 7, if this ensures a sufficiently great fan power of the overall system. In the present example, $T_1=T_2$ applies. The power loss which falls off across board 2 may possibly also be acknowledged to control module 1 via a diagnostic line, and be included in the calculation of the control regimen as input signal $P_V$. A continuous activation, that is, a pulse duty factor of 100% of a motor 5 or 6, or both motors 5, 6, reduces the power loss in the respectively connected power output stage, since, for power semiconductors, critical pulse duty factors of 99% and for capacitor 7 critical pulse duty factors around 80% are equally avoided, and, by the maximum fan power, increases at the same time the heat dissipation by convection, whereby a rapid undershooting of $T_1$ and/or $T_2$ and a return to the original operating mode are made possible.

As long as only one motor 5, 6 is being operated using a fixed or maximum pulse duty factor $TV_{1'}$, $TV_{2'}$, the other motor 6, 5 may still be activated using a variable pulse duty factor $TV_2$, $TV_1$, whereby a regulation of the fan power of the fan system given off corresponding to the requested fan power remains possible. Only when the requested fan power continues to rise and, in spite of the maximum pulse duty factor $TV_{1'max}$ or $TV_{2'max}$ a critical limiting temperature $T_2$ sets in on the board, is one able to do without the controllability of the fan power, and have the two motors 5, 6 activated at a constant pulse duty factor $TV_{1'max}$ and $TV_{2'max}$, which corresponds to applying a non-pulsed direct current, and permits the two motors 5, 6 to run at maximum speed, whereby the maximum available fan power of the fan system is output at the same time. In this operating state, if the undershooting of the limiting temperature $T_2$ on the board still does not come about, there then takes place a continuous operation of the fan system in an uncontrolled operating mode, while further monitoring the board temperature via signal $T_{NTC}$. If the board temperature rises further, which may be the case because of extremely unfavorable environmental conditions, then, when a further limiting temperature $T_3$ is reached, both motors 5, 6 are switched off by setting the pulse duty factors $TV_1$, $TV_2$ to zero. Because of the subdivision, of the fan power to be output, to two separately operated motors 5, 6, the possibility comes about, at normal operating conditions, of essentially letting one motor 5 produce the requested fan power. If motor 5 is dimensioned in a manner similar to comparable fan systems having only one motor, an energy consumption comes about that is comparable to the usage of customary fan systems. However, because of second motor 6, the fan system according to the present invention has available to it considerable power reserves, which is why a critical operating state, which leads to the switching off of the fan system when limiting temperature $T_4$ is reached, is reached considerably less often than was the case with the usual fan systems. This achieves a clear increase in the availability of the fan system, without substantially increasing the energy requirement of the fan system. At the same time, at parallel operation of the two motors 5, 6, a controlled output of requested fan power up to substantially higher powers and temperature conditions is possible, which only permits an uncontrolled continuous operation in the usual systems. Because of the asymmetrical design of motors 5, 6, it may be achieved that larger motor 5 is able to be controlled in a wide range of different operating conditions, like a usual motor in fan systems having one motor. For instance, below a relatively low limiting temperature $T_4$ and/or below a fixed fan power, automatically only one motor 5 may be operated. Furthermore, in response to the operation of larger motor 5 using continuous current, because of the overall smaller power share of motor 6, there comes about a particularly wide power range in which a controlled output of the requested fan power is made possible by the fan system according to the present invention.

Alternatively to the exemplary embodiment described, the fan system may also be operated taking particular care by the parallel operation of the two motors 5, 6 at low requested fan powers and/or board temperatures, by selecting a control regimen which minimizes the board temperature, for example. In both variants, data on the environmental temperature $T_U$, the available operating voltage $U_B$, the power loss $P_V$ and other available parameters may be included in the stipulation of the respective pulse duty factors $TV_1$, $TV_2$, since these data as a rule make possible the prognosis of the thermal response of board 2, whereby, for instance, brief exceedings of limiting temperatures may be detected as being non-qualified and may be ignored.

What is claimed is:

1. A fan system, comprising:
   two electric motors;
   two circuit breakers provided on a board, wherein an operating voltage of the two electric motors is supplied via the circuit breakers;
   a control module for controlling the two circuit breakers; and
   at least one temperature sensor provided on the board;
   wherein the control module evaluates a signal from the temperature sensor and a requested fan power to set pulse duty factors of pulsed control voltages at each of the two circuit breakers in such a way that the requested fan power is reached without a temperature of the board exceeding a first temperature limit, and
   wherein, responsive to the board temperature exceeding a second temperature limit, at least one pulse duty factor of the pulsed control voltage at a first of the two circuit breakers is set to a constant value of 100% and at least one pulse duty factor of the pulsed control voltage at a second of the two circuit breakers is set such that a total output fan power of the fan system corresponds to the requested fan power.

2. The fan system as recited in claim 1, wherein the two electric motors have different nominal powers.

3. The fan system as recited in claim 2, wherein the control module takes into consideration at least one of the following data in stipulating the pulse duty factors at which the two circuit breakers are operated: (a) present operating voltage of the two electric motors; (b) environmental temperature of the fan system; and (c) output power loss.

4. A method for operating a fan system having two fans driven by corresponding two pulse-width-modulation-controlled motors, the fan system further including two circuit breakers provided on a board, the method comprising:
   supplying an operating voltage of the two electric motors via the two circuit breakers;
   setting pulse duty factors of pulsed control voltages at each of the two circuit breakers in such a way that a requested fan power is reached without a temperature of the board exceeding a first temperature limit; and
   setting, responsive to the board temperature exceeding a second temperature limit, at least one pulse duty factor of the pulsed control voltage at a first of the two circuit breakers to a constant value of 100% and at least one pulse duty factor of the pulsed control voltage at a second of the two circuit breakers such that a total output fan power of the fan system corresponds to the requested fan power.

5. The method as recited in claim 4, wherein only one motor is operated below at least one of a specified requested fan power and a third temperature limit.

6. The method as recited in claim 4, wherein the pulse duty factors are set so as to minimize the board temperature.

7. The method as recited in claim 4, wherein pulse duty factors of the two circuit breakers are set to zero when a fourth specified limiting temperature is reached, the fourth specified limiting temperature being higher than the first temperature limit.

8. The method as recited in claim 4, wherein at least one of the following data are taken into consideration in stipulating the pulse duty factors at which the two circuit breakers are operated: (a) present operating voltage of the two electric motors; (b) environmental temperature of the fan system; and (c) output power loss.

9. A fan system, comprising:
   two electric motors;
   two circuit breakers provided on a board, wherein an operating voltage of the two electric motors is supplied via the circuit breakers;
   a control module for controlling the two circuit breakers; and
   at least one temperature sensor provided on the board;
   wherein the control module evaluates a signal from the temperature sensor and a requested fan power to set pulse duty factors of pulsed control voltages at each of the two circuit breakers in such a way that the requested fan power is reached without exceeding a temperature limit, and wherein the control module initially activates a second of the two electric motors when the temperature limit is reached during operation of a first of the two electric motors, and the control module, upon activating the second motor, sets the pulse duty factors of the two motors to reduce an overall power loss while providing the requested fan power.

10. A fan system, comprising:

two electric motors;

two circuit breakers provided on a board, wherein an operating voltage of the two electric motors is supplied via the circuit breakers;

a control module for controlling the two circuit breakers; and at least one temperature sensor provided on the board;

wherein the control module evaluates a signal from the temperature sensor and a requested fan power to set pulse duty factors of pulsed control voltages at each of the two circuit breakers in such a way that the requested fan power is reached without a temperature of the board exceeding a first temperature limit, and wherein responsive to the board temperature exceeding a second temperature limit, the pulse duty factor of the pulsed control voltage at a first of the two circuit breakers is lowered and the pulse duty factor of the pulsed control voltage at a second of the two circuit breakers is increased.

* * * * *

UNITED STATES PATENT AND TRADEMARK OFFICE
CERTIFICATE OF CORRECTION

PATENT NO. : 8,628,310 B2
APPLICATION NO. : 12/449004
DATED : January 14, 2014
INVENTOR(S) : Koch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this
Twenty-second Day of September, 2015

Michelle K. Lee
*Director of the United States Patent and Trademark Office*